(12) United States Patent
Roberto et al.

(10) Patent No.: US 8,137,045 B2
(45) Date of Patent: Mar. 20, 2012

(54) BIN TUNNEL WITH COLLAPSIBLE SIDES

(75) Inventors: Joseph F. Roberto, Oakville (CA); David K. Yamamoto, Paris (CA); Ian R. Pollock, Kitchener (CA)

(73) Assignee: Shred-Tech Corporation, Cambridge, ON (CA)

( * ) Notice: Subject to any disclaimer, the term of this patent is extended or adjusted under 35 U.S.C. 154(b) by 560 days.

(21) Appl. No.: 12/193,031

(22) Filed: Aug. 17, 2008

(65) Prior Publication Data

US 2009/0045643 A1   Feb. 19, 2009

Related U.S. Application Data

(60) Provisional application No. 60/956,280, filed on Aug. 16, 2007.

(51) Int. Cl.
*B65F 3/00* (2006.01)
(52) U.S. Cl. .................................. 414/540; 414/467
(58) Field of Classification Search ............... 296/24.3; 414/544, 467, 539, 478, 479, 495, 498, 540, 414/541, 542; 241/101.74, 101.741, 101.742, 241/185.5, DIG. 38; 280/80.1, 165, 175
See application file for complete search history.

(56) References Cited

U.S. PATENT DOCUMENTS

| | | | | |
|---|---|---|---|---|
| 3,271,065 A * | 9/1966 | Scuris | | 296/172 |
| 3,308,845 A * | 3/1967 | Bellas et al. | | 137/234.6 |
| 3,469,356 A * | 9/1969 | White | | 52/71 |
| 5,248,180 A * | 9/1993 | Hussaini | | 296/171 |
| 5,983,576 A * | 11/1999 | Hanser et al. | | 52/67 |
| 6,299,229 B1 * | 10/2001 | Becenas Nieto | | 296/24.3 |
| 6,588,691 B2 * | 7/2003 | Yamamoto et al. | | 241/101.74 |
| 2009/0045644 A1 * | 2/2009 | Glass et al. | | 296/24.3 |

* cited by examiner

*Primary Examiner* — Saul Rodriguez
*Assistant Examiner* — Glenn Myers
(74) *Attorney, Agent, or Firm* — Daryl W. Schnurr (57) ABSTRACT

A bin tunnel having collapsible sides is used with a truck box of a truck to load content into the truck box from a bin that is sized to fit within the bin tunnel when the bin tunnel is in an open position. When the bin tunnel is in a closed position a footprint of the bin tunnel is very small compared to the open position because the sides are retracted. The footprints can be less when the bin tunnel is in the closed position from thirty (30) percent of the footprint of the bin tunnel in the open position. When the bin tunnel is closed, the contents of the truck box are secure as the space inside of the closed bin tunnel is too small to allow access to the interior.

15 Claims, 9 Drawing Sheets

BIN TUNNEL WITH COLLAPSIBLE SIDES

Applicant claims the benefit of U.S. Provisional Application Ser. No. 60/956,280 filed on Aug. 16, 2007

BACKGROUND OF THE INVENTION

1. Field of the Invention

This invention relates to a bin tunnel for use with a truck box of a truck to load content into the truck box using a bin that is sized to fit into the bin tunnel when the bin tunnel is in an open position, the bin tunnel having collapsible sides, resulting in a small footprint when the bin tunnel is in a closed position.

2. Description of the Prior Art

It is known to have bin tunnels to load the content of a bin into a truck box of a truck. Bin tunnels have a closed position in which an outer wall of the bin tunnel is flush with an outer wall of the truck box. When the truck is being driven, the bin tunnel is in the closed position. When the truck is stopped and it is desired to empty the contents of one or more bins into the truck box, the bin tunnel is pulled outward from the truck box to an open position. The bin tunnel and the bin to be emptied are appropriately sized relative to one another so that the bin will fit into the bin tunnel when the bin tunnel is in the open position. A bin lifting mechanism is mounted on the inner wall of the bin tunnel to lift up the bin and turn it upside down to empty the contents into the truck box. The inner wall of the bin tunnel is a recessed wall built into the truck box. Where the bin contains items to be shredded, the truck box can contain a shredder or the truck can simply be a collection vehicle that delivers the contents to another location to be shredded. A bin tunnel is described in Yamamoto et al U.S. Pat. No. 6,588,691 issued Jul. 8, 2003.

The extendable and retractable portion of existing bin tunnels has the same internal dimensions whether the bin tunnel is in the open position or in the closed position. The truck box must be designed to accommodate the size of the bin tunnel in the closed position and the available space within the bin tunnel for storage of content, whether shredded or unshredded, or other storage is reduced by the depth of the bin tunnel as the extendable and retractable portion of the bin tunnel must fit inside the truck box when the bin tunnel is in a closed position. The inner wall must be recessed by the same distance that the bin tunnel extends beyond the side wall of the truck box. when the bin tunnel is in the open position. Since the usable width of the truck box is reduced by the inner wall, this reduces the size of the payload of the truck and decreases the efficiency of the truck. Also, for mobile document systems where content is collected by a truck for shredding at another location, since the bin tunnel narrows the inner width of the truck box by the same distance that the bin tunnel extends beyond the sidewall of the truck box when the bin tunnel is in the open position, a standard size fork lift will not fit into the truck box for unloading.

With existing bin tunnels, when the bin tunnel is in a closed position, there is still sufficient space within the bin tunnel for a person to access the interior of the truck body through the bin tunnel. This access can be a security problem when the contents of the truck box are not shredded.

SUMMARY OF THE INVENTION

It is an object of the present invention to provide a bin tunnel having collapsible sides so that a depth of the bin tunnel in a closed position is substantially less than fifty (50) percent of the depth of the bin tunnel in an open position.

A bin tunnel is used with a truck box of a truck to load the content into the truck using a bin that is sized to fit into the bin tunnel. The bin tunnel comprises an outer portion, being a front, a top and two sides and an inner portion with a lift mechanism mounted on an inner wall thereof, the inner wall being fixed within said truck box. The outer portion is slidably supported on the truck box to enable the outer portion to be moved outward from the truck box to an open position of the bin tunnel and moved inward to a closed position of the bin tunnel in which the front is substantially flush with an outer side wall of the truck box. The outer portion of the bin tunnel is supported on the truck box independently of the sides, the sides being collapsible relative to the front. In the open position, the bin tunnel has sufficient height, depth and width to receive the bin, the lift mechanism being constructed to removably connect to the bin and to raise the bin upward within the bin tunnel and tilt the bin to empty the contents of the bin into the truck box. A depth of the bin tunnel in the closed position being substantially less than fifty (50) percent of the depth of the bin tunnel in the open position, the sides being extended in the open position and retracted in the closed position.

A bin tunnel is used with a truck box of a truck to load content of a bin into the truck box. The bin is sized to fit within the bin tunnel on an elevator that can raise and tip the bin. The bin tunnel is located on a side of a truck box and comprises a fixed inner wall, two side walls and an outer wall with slidable supports to enable the side walls and the outer wall to be moved outward and inward relative to the inner wall between an open position and a closed position respectively. The side walls are collapsible so that a depth of the bin tunnel in the closed position is significantly less than a depth of the bin tunnel in the open position. The bin fits within the bin tunnel when the bin tunnel is in the open position, the elevator being mounted on the inner wall, the inner wall being a recessed wall of the truck box. The outer wall is substantially flush with a side of the truck box when the bin tunnel is in the closed position.

A bin tunnel is used with a truck box of a truck to load content into the truck box, the bin being located on a side of the truck box. The bin is sized to fit into the bin tunnel when the bin tunnel is in an open position. The bin tunnel comprises a fixed inner wall, an outer wall and two sidewalls with slidable supports to move the outer wall and sidewalls between a closed position and the open position relative to the inner wall. The sidewalls are collapsible so that the distance between the inner wall and the outer wall when the bin tunnel is in the closed position is substantially less than a distance between the inner wall and the outer wall when the bin tunnel is in the open position.

DETAILED DESCRIPTION OF A PREFERRED EMBODIMENT

Figure 1:
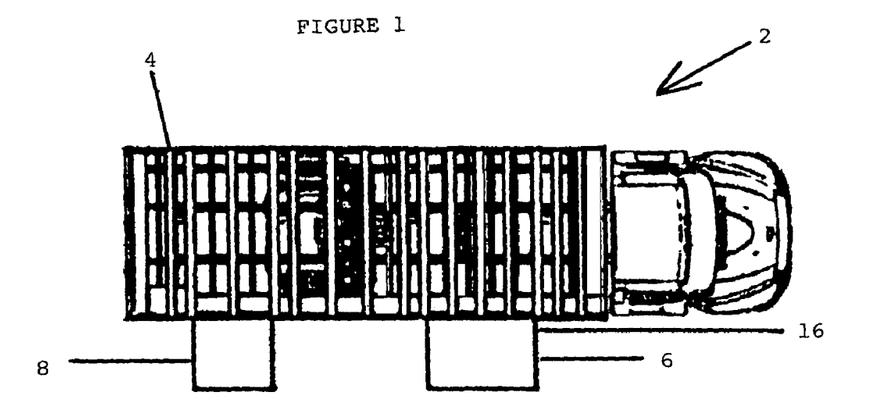
FIG. 1 is a schematic top view of a truck with a truck box having two bin tunnels that are in an open position.
Figure 2:
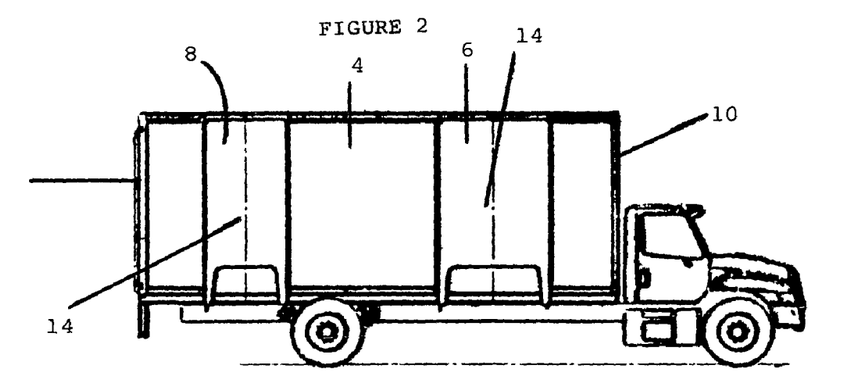
FIG. 2 is a side view of the truck of FIG. 1.
Figure 3:
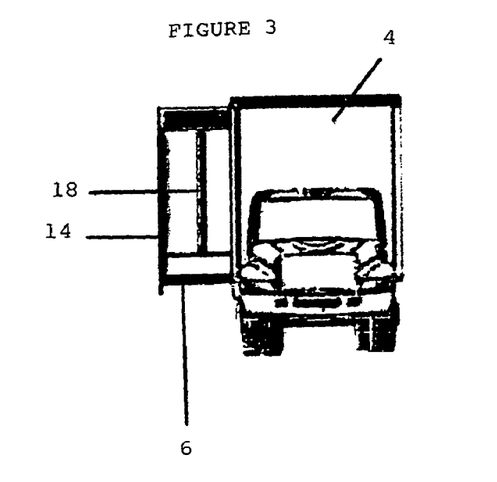
FIG. 3 is a front view of the truck of FIG. 1.

In FIGS. 1 to 3, a truck 2 has a truck box 4 with two schematically shown bin tunnels 6, 8 in an open position. The bin tunnels 6, 8 are located on a passenger side of the truck 2 and the bin tunnel 6 is located near a front 10 of the truck box 4 and the bin tunnel 8 is located near a rear 12 of the truck box 4. The bin tunnel 6 is larger than the bin tunnel 8 and each bin tunnel has an outer wall 14 and two sidewalls 16. The bin tunnel 6 can receive larger bins (not shown) than the bin tunnel 8. In FIG. 3, it can be seen that the sidewalls 16 (only one of which is shown) are collapsible as each sidewall has a fold line 18 therein. The roof and floor have been omitted from FIG. 1 to show the structural supports.

Figure 4A:
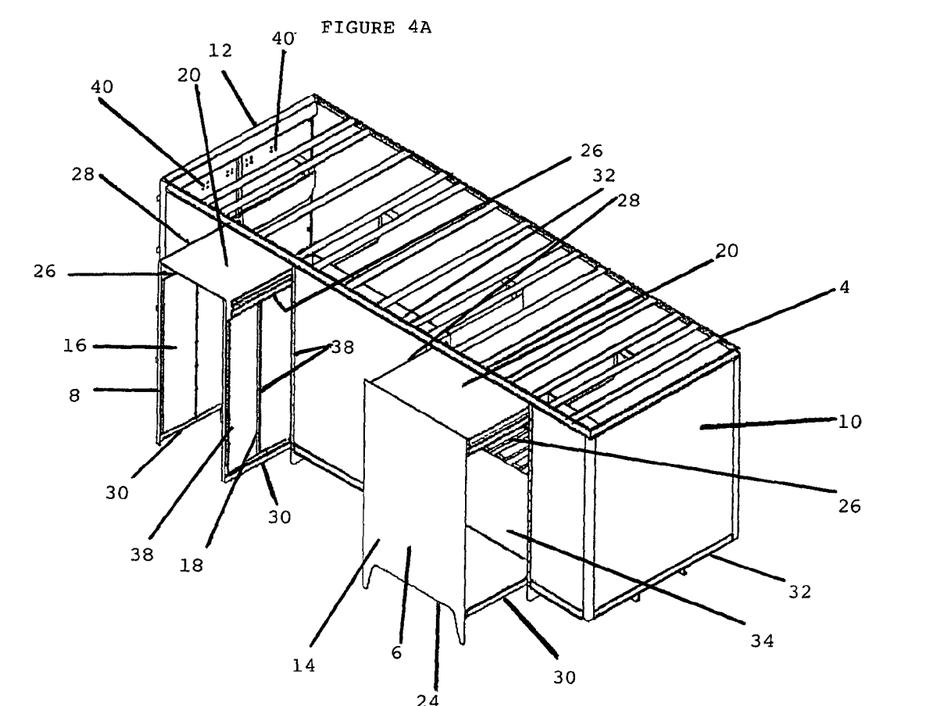
FIG. 4A is a perspective view of a truck box with two bin tunnels in an open position.
Figure 4B:
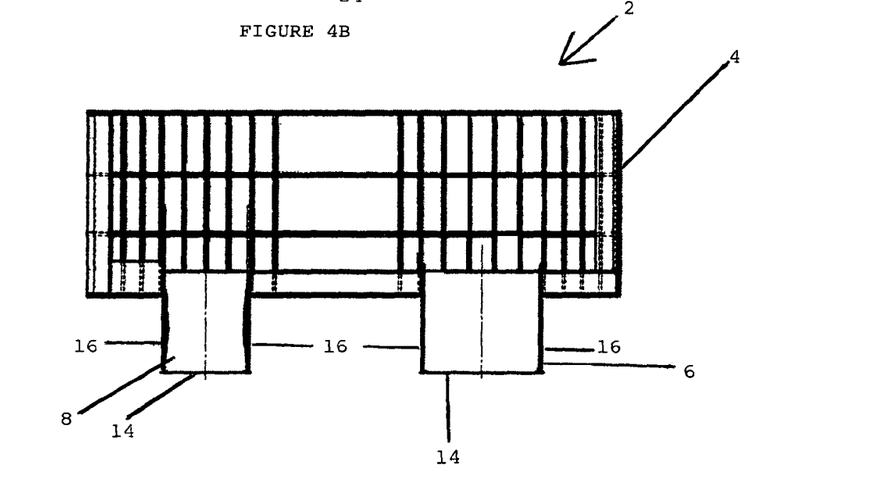
FIG. 4B is a schematic top view of the truck box with the bin tunnels in the open position.

In FIG. 4, both bin tunnels 6, 8 are in the open position and each bin tunnel has a roof 20 thereon. The bin tunnel 6 has an outer wall or front 14 installed thereon but no sidewalls are installed. The outer wall 14 has an inverted U-shaped lower portion 24 to provide clearance for a bin (not shown) that is sized for use with the bin tunnel 6. A drawer slide 26 is located at a top 28 of the bin tunnels 6, 8. There are two drawer slides 26 on each bin tunnel 6, 8, one on each side of each bin tunnel. Each bin tunnel 6, 8 has two slidable beams 30 at a lower end of each side to provide support for each bin tunnel. The slidable beams 30 slide in and out with the bin tunnel beneath a floor 32 of the truck box 4. Each bin tunnel 6, 8 has an inner wall 34 that is part of the truck box 4 and does not move when the bin tunnel moves between an open and closed position. Each bin tunnel 6, 8 has collapsible sidewalls 16 thereon but the sidewalls have been omitted from the bin tunnel 6 to expose an interior. The sidewalls 16 shown on the bin tunnel 8 are hinged on their outer and inner longitudinal edges 38 so that the sidewalls are bifolds and fold along the foldline 18 when the bin is in the closed position (not shown in FIG. 4). The truck box 4 has rear doors 40 that allow access to an interior of the truck box. The roof of the truck box 4 has been deleted to expose an interior. Each of the bin tunnels has a lift mechanism that is conventional and, except for FIGS. 16 and 17, has been omitted from the drawings. The same reference numerals are used in FIG. 4 as those used in FIGS. 1 to 3 for those components that are identical. The two bin tunnels 6, 8 are of different sizes but the components of the two bin tunnels are numbered identically.

Figure 5:
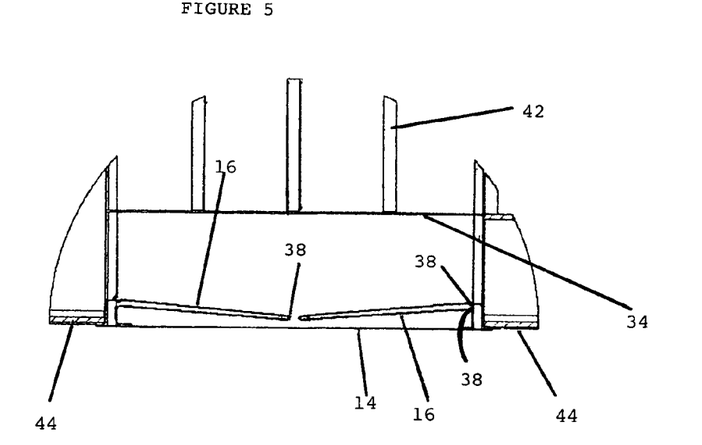
FIG. 5 is a top view of a bin tunnel in a partially shown truck box where the bin tunnel is in a closed position.
Figure 6A:
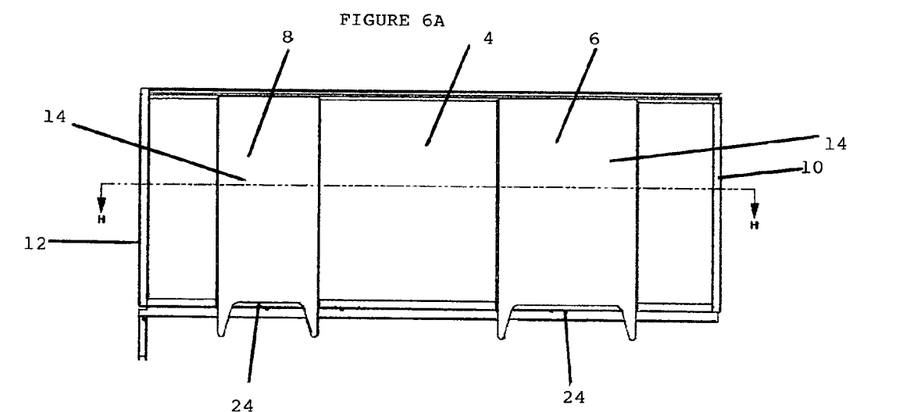
FIG. 6A is a side view of the truck box with the bin tunnels in a closed position.
Figure 6B:
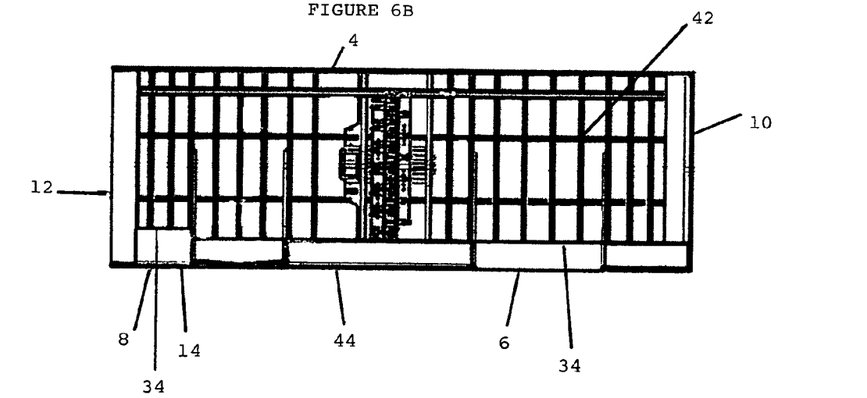
FIG. 6B is a schematic top view of a truck box with one of the bin tunnels shown in a closed position.

In FIGS. 5, 6A and 6B, FIG. 6A is a side view of the truck box 4 and FIG. 6B is a sectional view of the truck box along the section H-H of FIG. 6A. The floor has been deleted in FIG. 6B to show structural supports 42 beneath the floor. The same reference numerals are used in FIGS. 5, 6A and 6B as those used in FIGS. 1 to 4 for those components that are identical. In FIG. 6B, the inner wall 34 of each bin tunnel 6, 8 extends along the truck box 4 from the front 10 almost to the rear 12. The bin tunnel 6 has been deleted from FIG. 6B except for the inner wall 34 which is also a fixed part of the truck box 4. FIG. 5 is an enlarged view of that part of FIG. 6B contained within the circle around the bin tunnel 8. The bin tunnel 8 is in the closed position and the outer wall 14 is substantially flush with a side 44 of the truck box 4 adjacent to the bin tunnel 8. The sidewalls 16 are folded as shown and extend inward in the bin tunnel to almost meet one another at a center thereof. By comparing FIGS. 4 and 6B, a distance from the outer wall 14 to the inner wall 34 when the bin tunnels 6, 8 are in the closed position compared to the distance when the bin tunnels are in the open position is significantly less and is substantially less than fifty (50) percent, but still more preferably less than forty (40) percent. More preferably when the bin tunnel is closed, the distance is less than thirty (30) percent and is substantially twenty-seven (27) percent of the distance when the truck box is open. A footprint of the bin tunnel is the closed position is substantially less than fifty (50) percent of a footprint of the bin tunnel in the open position.

Figure 7:
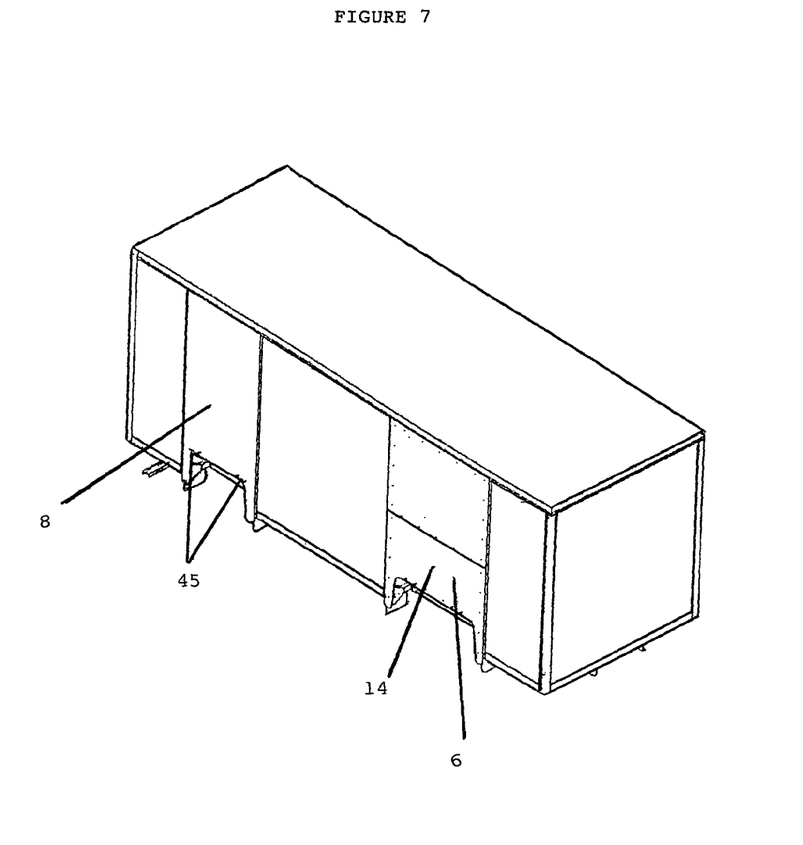
FIG. 7 is a perspective view of a truck box having two bin tunnels in a closed position.
Figure 8:
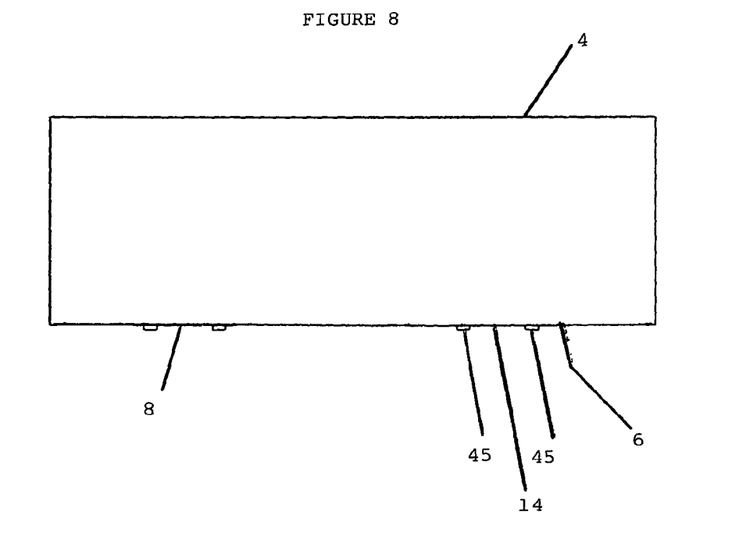
FIG. 8 is a top view of the truck box of FIG. 7.

In FIGS. 7 and 8, the same reference numerals are used as those used in FIGS. 1 to 6B for those components that are identical. Each of the bin tunnels 6, 8 has two handles 45 extending outward from the outer wall 14 to enable an operator to pull the bin tunnels outward from the closed position to the open position and to push the bin tunnels inward from the open position to the closed position when desired.

Figure 9:
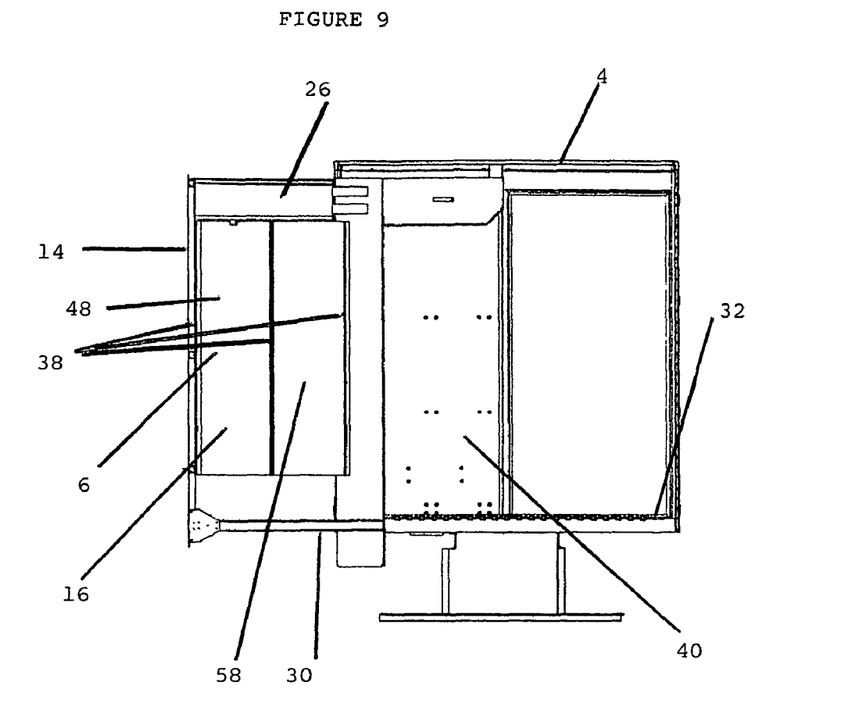
FIG. 9 is a schematic front view of a truck box with a bin tunnel in an open position.
Figure 10:
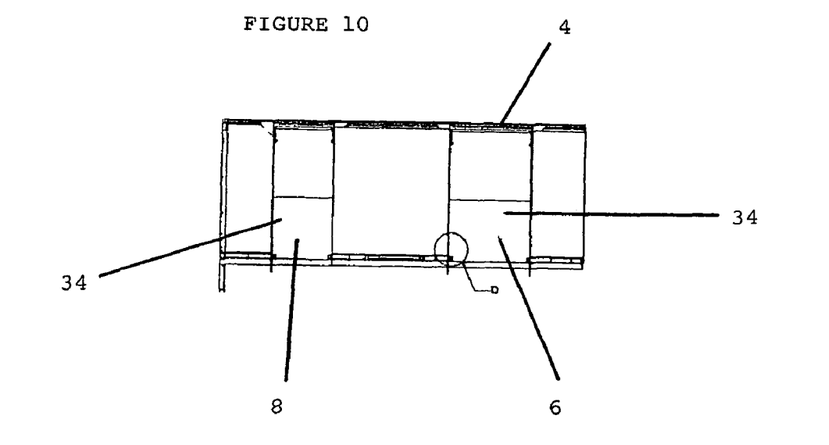
FIG. 10 is a schematic top view of a truck box having two bin tunnels in closed positions.
Figure 11:
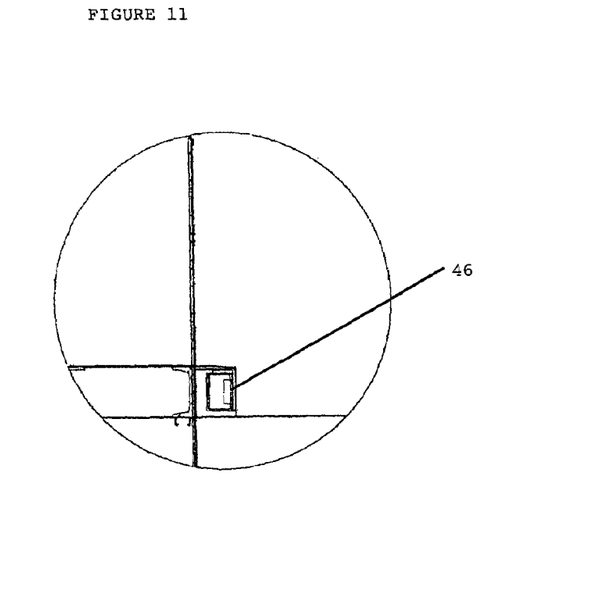
FIG. 11 is an enlarged front view of a locking cylinder circled in FIG. 10.
Figure 12:
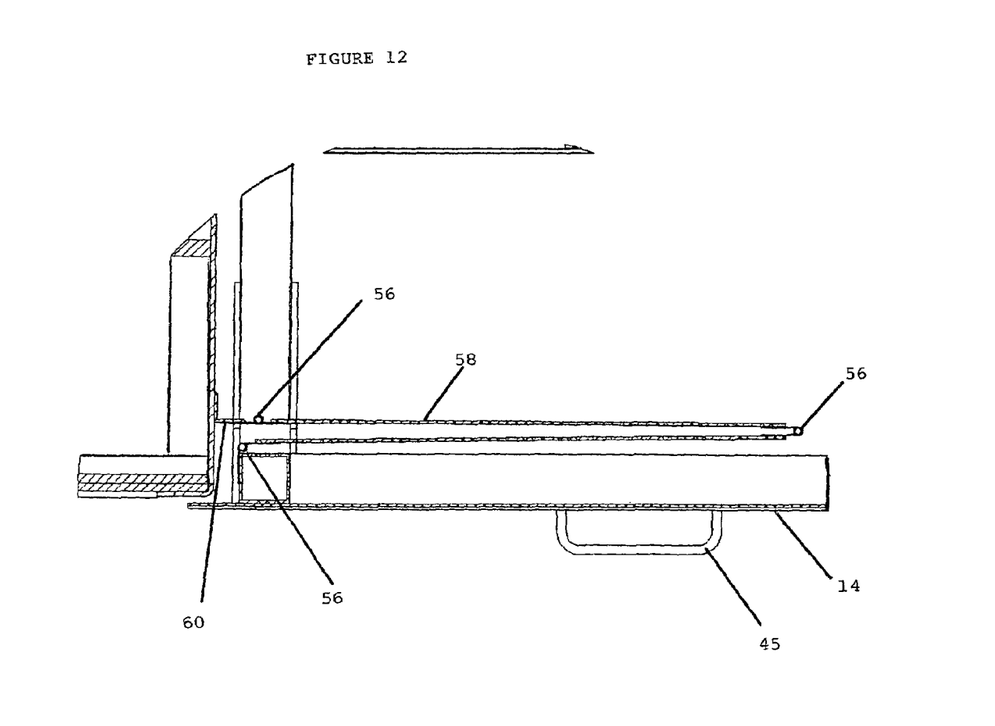
FIG. 12 is an enlarged top partially sectional view of one side wall in a closed position.

In FIGS. 9 to 12, the same reference numerals are used as those in FIGS. 1 to 9 for those components that are identical. FIG. 11 is an enlarged view of detail D from FIG. 10 showing a locking cylinder 46 at a lower left corner of the bin tunnel 6. There are other locking cylinders at a lower left corner of bin tunnel 8 and locking cylinders at the lower right corner of each of the bin tunnels 6, 8. The bin tunnels 6, 8 are omitted from FIG. 10 except for the inner wall 34 to expose the locking cylinder 46. Preferably, there are also upper locks on each of the bin tunnels 6, 8. The locking cylinders and the upper locks lock each of the bin tunnels in the closed position when the truck is travelling and also to prevent access to an interior of the truck box for security purposes when the bin tunnels are closed. In FIG. 9, the drawer slide 26 is partially shown as is the beam 30. The sidewall 16 has an outer panel 48 and an inner panel 58. FIG. 12 provides a further enlarged view of one of the sidewalls 16 in the closed position. There is a hinge 56 along each of the longitudinal edges 38. The hinge 56 on the inner panel 58 is adjustable by means of a bolt 60. The outer wall 14 has a handle 62 thereon. There are two handles 45 on each outer wall 14 preferably located symmetrically about a longitudinal center line about the outer wall 14. Only half of the outer wall 14 is shown in FIG. 12. The handles 45 allow an operator to manually pull the bin tunnel outward to the open position and inward to the closed position.

Figure 13:
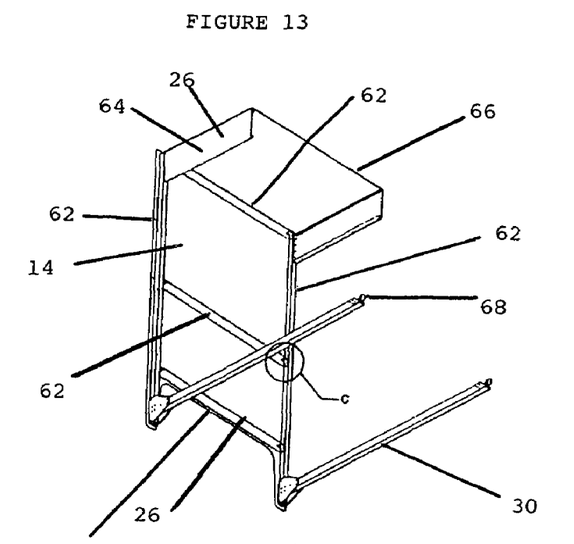
FIG. 13 is a perspective view of a partial bin tunnel when viewed from an inside.
Figure 14A:
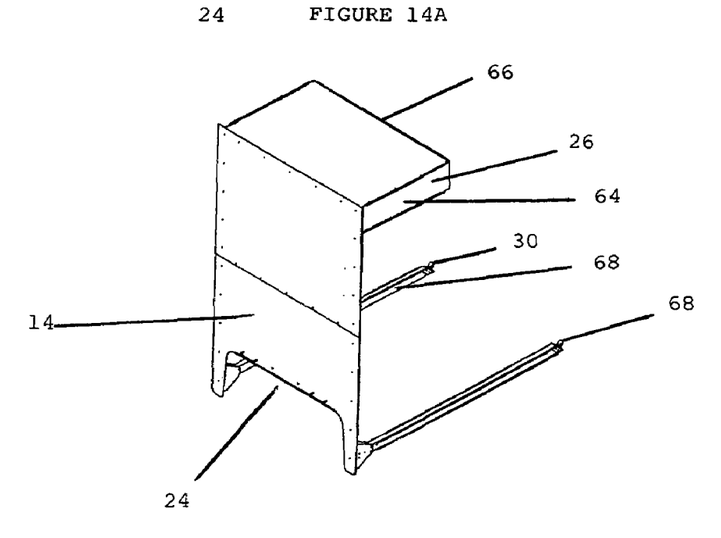
FIG. 14A is a perspective view of the partial bin tunnel of FIG. 13 when viewed from an outside.
Figure 14B:
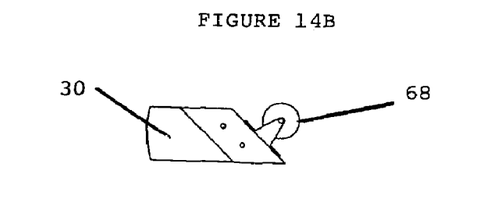
FIG. 14B is a partial side view of an end of a slidable support beam with a caster thereon.

FIGS. 13 and 14A are perspective views of part of the bin tunnel 8. The same reference numerals are used in FIGS. 13 and 14A as those used in FIGS. 1 to 12 for those components that are identical. The outer wall 14 has frame members 62 on an interior thereof an outer section 64 of the drawer slide 26 are connected at an inner end by a support member 66. The slidable beams 30 have a caster 68 at an inner end thereof. As shown in FIG. 14B, the casters 68 (only one of which is shown) extend slightly above an upper surface of each of the beams 30 to make it easier for a user to open and close the bin tunnel.

Figure 15:
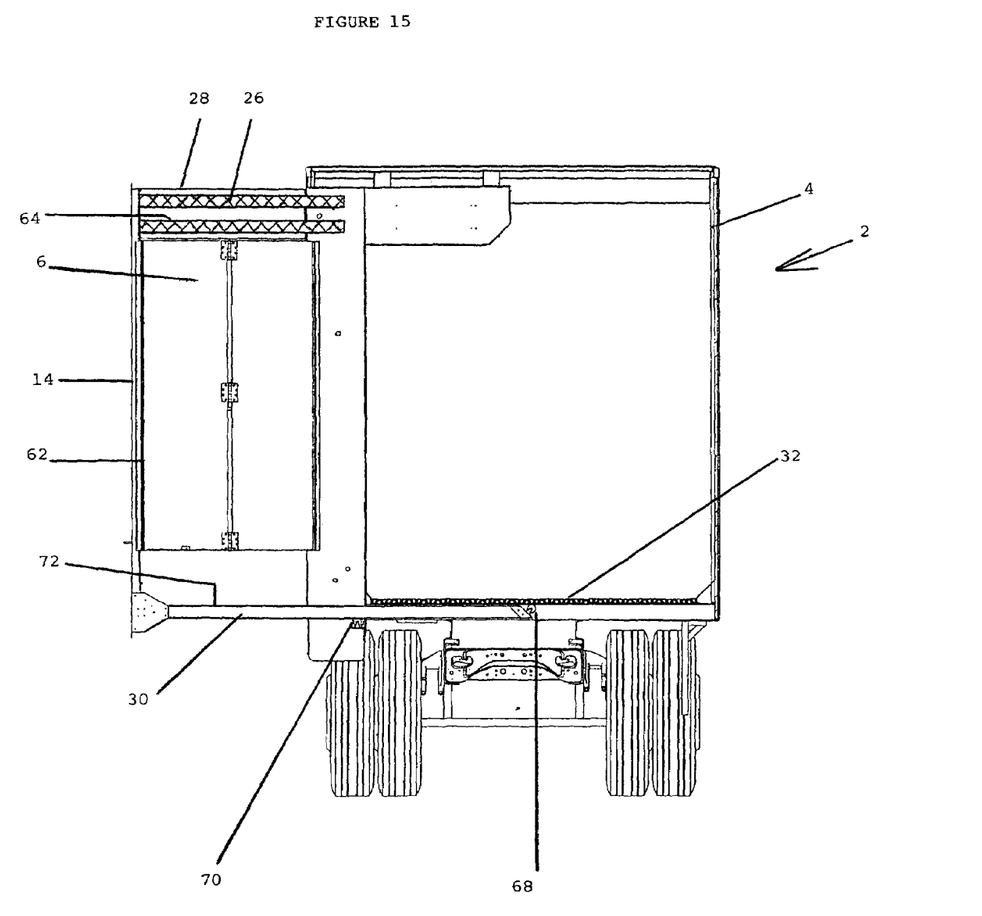
FIG. 15 is a side view showing a slidable support beam at a bottom of the bin tunnel.

In FIG. 15, the same reference numerals are used as those used in FIGS. 1 to 14 for those components that are identical. There is a second caster 70 mounted beneath the truck box 4 to support an outer portion of the beams 30 (only one of which is shown in FIG. 15) along with the caster 68 which is mounted on an inner end of the beam. The caster 68 is mounted to be slightly above an upper surface 72 of the beam 30 to reduce the friction between the beams and the truck body to enable the beams to be able be moved inward and outward more easily. The sidewalls have been omitted from the bin tunnel 6 in FIG. 15.

Figure 16:
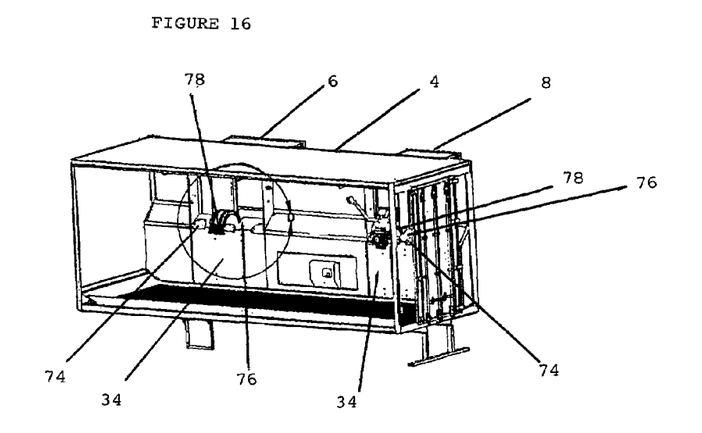
FIG. 16 is a schematic partial perspective view of an interior of the truck box.
Figure 17:
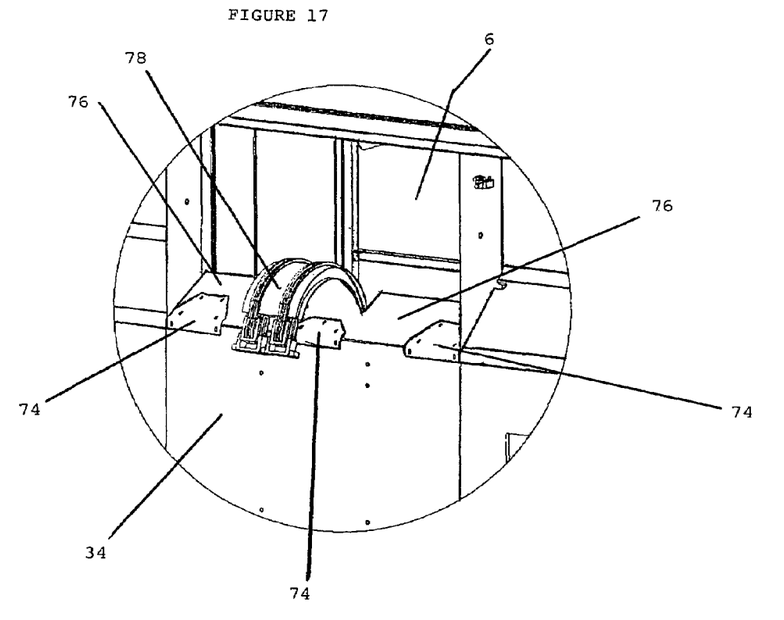
FIG. 17 is an enlarged view of that part of the interior of the truck box enclosed within a circle in FIG. 16.

In FIGS. 16 and 17, metal plates 74 extend from the inner wall 34 outward to support a seal 76 that extends across the bin tunnel 6 to substantially close off a vertical passage of said bin tunnel 6 (best seen in FIG. 17). The seal is shaped to accommodate a lift mechanism 78 mounted on the inner wall 34. The same reference numerals are used in FIGS. 16 and 17 as those used in FIGS. 1 to 15 for those components that are identical.

The bin tunnel 8 has a similar seal sized to fit the bin tunnel 8 but that seal is not shown in the drawings.

While the collapsible sides of the bin tunnels are described as being hinged bifold panels, the sides can be constructed in various other ways to achieve the same purpose of utilizing less interior space of the truck box by being collapsible.

We claim:

1. A bin tunnel for use with a truck box of a truck to load content into said truck box using a bin that is sized to fit into said bin tunnel, said bin tunnel comprising an outer portion being a front, a top and two sides and an inner portion with a lift mechanism mounted on an inner wall thereof, said inner wall being fixed, said outer portion being slidably supported on said truck box to enable said outer portion to be moved outward from said truck box to an open position of said bin tunnel and moved inward to a closed position of said bin tunnel in which said front is substantially flush with an outer side wall of said truck box, said outer portion of said bin tunnel being supported on said truck box independently of said sides, said sides being collapsible relative to said front, in said open position said bin tunnel having sufficient height, depth and width to receive said bin, a lower end of said bin tunnel being vertically supported by two slidable beams that slide in and out beneath a floor of said truck box as said bin tunnel slides in to said closed position and out to said open position respectively, said lift mechanism being constructed to removably connect to said bin and to raise said bin upward within the bin tunnel and tilt the bin to empty the contents of said bin into the truck box, a depth of said bin tunnel in said closed position being substantially less than fifty (50) percent of a depth of the bin tunnel in said open position, said sides being extended in said open position and retracted in said closed position.

2. A bin tunnel as claimed in claim 1 wherein access to said truck box through said bin tunnel is closed off when said bin tunnel is in said closed position.

3. A bin tunnel as claimed in claim 2 wherein said sides are bifold panels that fold substantially in half when said bin tunnel is in said closed position and extend fully outward when said bin tunnel is in said open position.

4. A bin tunnel as claimed in claim 2 wherein said bin tunnel has two drawer slides near said top, said drawer slides extending into said truck box.

5. A bin tunnel as claimed in claim 2 wherein a depth of said bin tunnel is a distance between said inner wall and said front, said depth when said bin tunnel is in said closed position being less than forty (40) percent of said depth when said bin tunnel is in said open position.

6. A bin tunnel as claimed in claim 2 wherein said depth when said bin tunnel is in said closed position is less than thirty (30) percent of said depth when said bin tunnel is in said open position.

7. A bin tunnel as claimed in claim 6 wherein when said bin tunnel is in said closed position, a space between said lift mechanism and said front is substantially occupied by said side walls.

8. A bin tunnel as claimed in claim 1 wherein said bin tunnel has a footprint in said closed position that is less than forty (40) percent of a footprint of said bin tunnel when said bin tunnel is in said open position.

9. A bin tunnel used with a truck box of a truck to load content from a bin into said truck box, said bin being sized to fit within said bin tunnel on a lift mechanism that can raise and tip said bin, said bin tunnel being located on a side of said truck box and comprising a fixed inner wall, two sidewalls and an outer wall with slidable supports to enable said sidewalls and said outer wall to be moved outward and inward relative to said inner wall between an open position and a closed position respectively, said slidable vertically supports at a lower end of said bin tunnel being two slidable beams that slides in and out beneath a floor of said truck box as said bin tunnel slides in to said closed position and out to said open position respectively, said side walls being collapsible so that a depth of said bin tunnel in said closed position is significantly less than a depth of said bin tunnel in said open position, said bin fitting within said bin tunnel when said bin tunnel is in said open position, said lift mechanism being mounted on said inner wall, said inner wall being a recessed wall of the truck box, said outer wall being substantially flush with a side of said truck box when said bin tunnel is in said closed position.

10. A bin tunnel for use with a truck box of a truck to load content from a bin into said truck box, said bin being located in a side of said truck box, said bin being sized to fit into said bin tunnel when said bin tunnel is in an open position, said bin tunnel comprising a fixed inner wall, an outer wall, and two side walls with slidable supports to move said outer wall and side walls between a closed position and said open position relative to said inner wall, said slidable vertically supports at a lower end of said bin tunnel being two slidable beams that slides in and out beneath a floor of said truck box as said bin tunnel slides in to said closed position and out to said open position respectively, said side walls being collapsible so that a distance between said inner wall and said outer wall when said bin tunnel is in said closed position is substantially less than a distance between said inner wall and said outer wall when said bin tunnel is in said open position.

11. A bin tunnel as claimed in claim 10 wherein said distance when said bin tunnel is in said closed position is substantially less than half of said distance when said bin tunnel is in said open position.

12. A bin tunnel as claimed in claim 11 wherein said distance when said bin tunnel is in said closed position is substantially one third (⅓) of said distance when said bin tunnel is in said open position.

13. A bin tunnel as claimed in claim 11 wherein said distance when said bin tunnel is in said closed position is substantially twenty-seven percent (27%) of said distance when said bin tunnel is in said open position.

14. A bin tunnel as claimed in claim 9 wherein said inner wall is recessed inside of said side of said truck box by substantially thirteen (13) inches, being a sufficient distance to accommodate said elevator and said sidewalls in a retracted position when said bin tunnel is in said closed position.

15. A bin tunnel as claimed in claim 9 where said bin tunnel has two drawer slides near said top, said drawer slides extending into said truck box, said bin tunnel being manually operable between said open position and said closed position.

* * * * *